United States Patent [19]
Seki

[11] Patent Number: 5,357,309
[45] Date of Patent: Oct. 18, 1994

[54] DISTANCE MEASURING DEVICE FOR A CAMERA

[75] Inventor: Yoichi Seki, Chiba, Japan

[73] Assignee: Seikosha Co., Ltd., Tokyo, Japan

[21] Appl. No.: 40,062

[22] Filed: Mar. 30, 1993

[30] Foreign Application Priority Data

Mar. 31, 1992 [JP] Japan .............................. 4-018672[U]

[51] Int. Cl.$^5$ .......................... G03B 13/36; G01C 3/08
[52] U.S. Cl. .......................................... 354/403; 356/1
[58] Field of Search ........................ 354/403; 356/1, 4; 250/201.4, 201.6

[56] References Cited

U.S. PATENT DOCUMENTS 4,615,616 10/1986 Shiomi .......................... 354/403 X
4,849,781 7/1989 Nakazawa et al. ............. 354/403 X
5,184,168 2/1993 Nonaka .............................. 354/403

Primary Examiner—W. B. Perkey
Attorney, Agent, or Firm—Jordan and Hamburg

[57] ABSTRACT

A camera distance measuring device in which center, left and right peripheral beams for illuminating a subject are emitted from the center, left and right infrared-emitting diodes, respectively. First and second intermediate electrodes are provided between a pair of electrodes of a position sensitive device. An arithmetic circuit calculates center, left and right distance data from a composite output of a plurality of amplifiers delivered synchronously with each of the center, left and right peripheral beams incident on the position sensitive device.

12 Claims, 3 Drawing Sheets

DISTANCE MEASURING DEVICE FOR A CAMERA

FIELD OF THE INVENTION

The present invention relates to a camera distance measuring device and, more particularly, to a camera distance measuring device which has a position sensitive device having first and second intermediate electrodes positioned between a pair of electrodes.

BACKGROUND OF THE INVENTION

As shown in FIG. 3, a conventional camera distance measuring device comprises an automatic focusing IC 22 (hereinafter referred to as "AFIC"), a position sensitive device 21 (hereinafter referred to as "PSD"), a light-emitting diode driver circuit 11 for driving a right infrared-emitting diode $IR_R$, a center infrared-emitting diode $IR_C$ and a left infrared-emitting diode $IR_L$ (infrared-emitting diodes will hereinafter be referred to as "IRED"), and a microprocessor 12 (hereinafter referred to as "CPU") for controlling the light-emitting diode driver circuit 11. Light that is projected onto a subject SUB from the IRED through a projection lens (not shown) is reflected from the subject (not illustrated) and enters the PSD 21 through a light-receiving lens (not illustrated). When the reflected light is incident on the PSD 21, a right distance signal $f_R$, a center distance signal $f_C$ and a left distance signal $f_L$ are delivered from a distance signal output terminal $T_{13}$ of the AFIC 22 to the CPU 12.

The AFIC 22 comprises preamplifiers $OP_1$ and $OP_3$, $OP_2$ and $OP_5$, and $OP_4$ and $OP_6$ corresponding to right PSD terminals $T_1$ and $T_3$, center PSD terminals $T_2$ and $T_5$ and left PSD terminals $T_4$ and $T_6$, respectively, to which electrodes of the PSD 21 are connected, synchronizing switches 3 and 4 for differential current, synchronizing switches 5 and 6 for holding background light, and switches 7 and 8 for holding background light. These switches are solid-state devices. The AFIC 22 further comprises operational amplifiers $OP_7$ and $OP_8$ for eliminating non-signal light, transistors $Q_3$ and $Q_4$ for bypassing background light, and a differential amplifier 10 for distance signals. The output terminals of the preamplifiers $OP_1$, $OP_2$ and $OP_4$ are connected to input terminals $P_1$, $P_2$ and $P_3$, respectively, of the differential current synchronizing switch 3. An output terminal $P_4$ of the synchronizing switch 3 is connected to the base of a transistor $Q_1$ in the distance signal differential amplifier 10, and also to the cathode of a logarithmic compression diode $D_1$ whose anode is connected to a power supply $+V_E$. The output terminals of the preamplifiers $OP_3$, $OP_5$ and $OP_6$ are connected to input terminals $P_1$, $P_2$ and $P_3$, respectively, of the differential current synchronizing switch 4. An output terminal $P_4$ of the synchronizing switch 4 is connected to the base of a transistor $Q_2$ in the distance signal differential amplifier 10, and also to the cathode of a logarithmic compression diode $D_2$ whose anode is connected to the power supply $+V_E$. Similarly, the input sides of the preamplifiers $OP_1$, $OP_2$ and $OP_4$ are connected to input terminals $P_1$, $P_2$ and $P_3$, respectively, of the background light hold synchronizing switch 5, and an output terminal $P_4$ of the synchronizing switch 5 is connected to the collector of the background light by-pass transistor $Q_3$. The emitter of the transistor $Q_3$ is connected to a reference potential node, while the base thereof is connected to one end of a background light hold capacitor $C_1$, the other end of which is connected to the reference potential node. The input terminals of the preamplifiers $OP_3$, $OP_5$ and $OP_6$ are connected to input terminals $P_1$, $P_2$ and $P_3$, respectively, of the background light hold synchronizing switch 6, and an output terminal $P_4$ of the synchronizing switch 6 is connected to the collector of the background light by-pass transistor $Q_4$. The base of the transistor $Q_4$ is connected to one end of a background light hold capacitor $C_2$, the other end of which is connected to the reference potential node. Further, the bases of the background light by-pass transistors $Q_3$ and $Q_4$ are connected to respective output terminals $P_2$ of the background light hold switches 7 and 8. Input terminals $P_1$ of the switches 7 and 8 are connected to the respective output terminals of the non-signal light eliminating operational amplifiers $OP_7$ and $OP_8$. A reference voltage $V_{REF}$ is applied to the (−) terminals of the operational amplifiers $OP_7$ and $OP_8$. The (+) terminals of the operational amplifiers $OP_7$ and $OP_8$ are connected to the respective bases of the transistors $Q_1$ and $Q_2$ in the distance signal differential amplifier 10.

The control circuit of the differential current synchronizing switches 3 and 4 and the background light hold synchronizing switches 5 and 6 are connected to the control output circuit of the CPU 12 through differential current synchronizing switch control terminals $T_7$ to $T_{10}$, respectively, while the control circuit of the background light hold switches 7 and 8 are connected to the control output circuit of the CPU 12 through background light hold switch control terminals $T_{11}$ and $T_{12}$, respectively.

It should be noted that the background light hold capacitors $C_1$ and $C_2$ are parts which are mounted externally of the AFIC 22.

In general, it is desirable for the PSD 21 to receive only signal light having the same wavelength as that of light emitted from the IRED. Therefore, the PSD 21 is provided with an optical filter formed from, for example, a resin material, so as to by-pass light of wavelength other than that of light emitted from the IRED, thereby eliminating the external light. However, the external light includes light having the same wavelength as that of light from the IRED. Accordingly, not only distance currents $I_1$ and $I_2$ derived from the light emitted from the IRED but also noise currents derived from the external light are output to the bases of the transistors $Q_1$ and $Q_2$ in the distance signal differential amplifier 10. Therefore, the light-emitting timing of the IRED is controlled by the CPU 12 so as to eliminate the noise currents due to the external light.

More specifically, when the background light hold switches 7 and 8 are controlled to be kept closed by the CPU 12 through the background light hold switch control terminals $T_{11}$ and $T_{12}$, the base current flows in the bases of the background light by-pass transistors $Q_3$ and $Q_4$ constantly. Accordingly, noise currents due to the external light, exclusive of the distance currents $I_1$ and $I_2$, are suppressed by the logarithmic compression diodes $D_1$ and $D_2$ at a level determined by the reference voltage $V_{REF}$. When the background light hold switches 7 and 8 are opened, the base voltages of the background light by-pass transistors $Q_3$ and $Q_4$ are fixed to the potentials of the background light hold capacitors $C_1$ and $C_2$. Accordingly, only the distance currents $I_1$ and $I_2$ are applied to the respective bases of the transistors $Q_1$ and $Q_2$ in the distance signal differential amplifier 10.

The camera distance measuring device arranged as described above, employs wiring to extend from the electrodes of the PSD 21 to the right PSD terminals $T_1$ and $T_3$, the center PSD terminals $T_2$ and $T_5$ and the left PSD terminals $T_9$ and $T_{12}$, $OP_5$ and $OP_6$ of the AFIC 22 and further uses the preamplifiers $OP_1$ to $OP_6$ to correspond to the right PSD terminals $T_1$ and $T_3$, the center PSD terminals $T_2$ and $T_5$ and the left PSD terminals $T_4$ and $T_6$. Therefore, the conventional distance measuring device suffers from the disadvantage that the chip size of the integrated circuit is large. In addition, as the number of conductors increases, it becomes more likely that signal light will be affected by noise.

SUMMARY OF THE INVENTION

The present invention aims at solving the above-described problems of the conventional camera distance measuring device and it is an object of the present invention to provide a camera distance measuring device wherein first and second intermediate electrodes are provided between a pair of electrodes of the position sensitive device, thereby minimizing the chip size of the automatic focusing IC, and reducing the number of conductors needed for the output terminals of the position sensitive device, and thus making it possible to minimize the influence of noise and to reduce the packaging space.

The camera distance measuring device for a camera of the present invention includes: center, left and right infrared-emitting diodes which emit a center beam for illuminating a subject in the center, and left and right peripheral beams for illuminating subjects in the left and right peripheries, respectively; a position sensitive device having a first electrode, a second electrode, and first and second intermediate electrodes between the first and second electrodes; a plurality of amplifiers having inputs connected to the first electrode, the second electrode, the first intermediate electrode, and the second intermediate electrode, respectively; and an arithmetic circuit that calculates center, left and right distance data from a composite output of the plurality of amplifiers delivered synchronously with each of the center, left and right peripheral beams incident on the position sensitive device.

Center, left and right peripheral beams for illuminating the subject are emitted from the center, left and right infrared-emitting diodes, respectively. The first and second intermediate electrodes are provided between the first and second electrodes of the position sensitive device. The arithmetic circuit calculates center, left and right distance data from a composite output of the plurality of amplifiers delivered synchronously with each of the center, left and right peripheral beams incident on the position sensitive device.

BRIEF DESCRIPTION OF THE DRAWINGS

In order that the invention may be made clearly understood, it will now be disclosed in greater detail with reference to the accompanying drawings, wherein.

DESCRIPTION OF THE PREFERRED EMBODIMENTS

Figure 2:
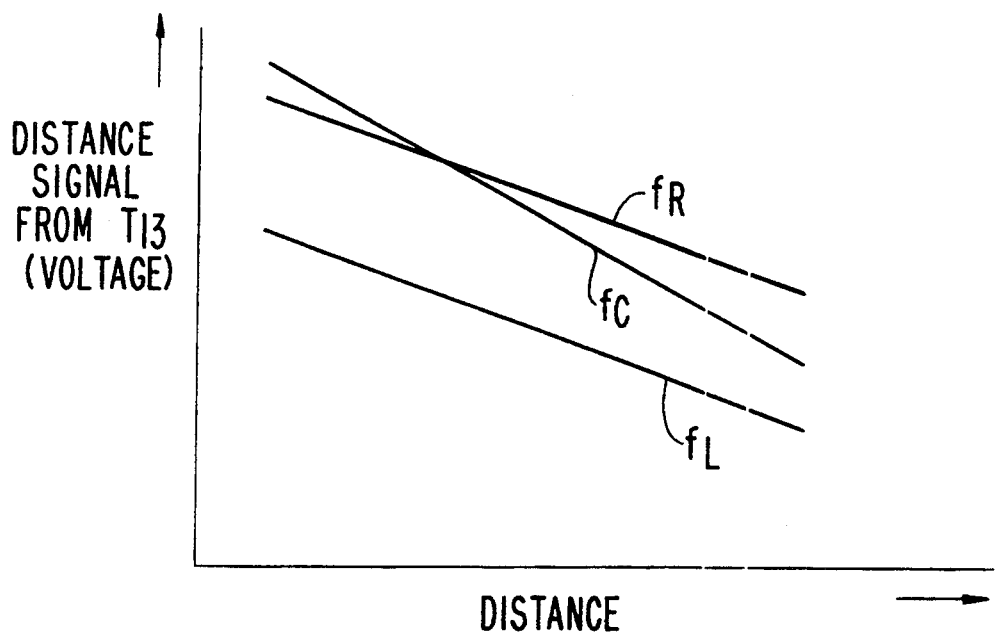
FIG. 2 is a graph showing the characteristics of the camera distance measuring device according to the present invention.
Figure 3:
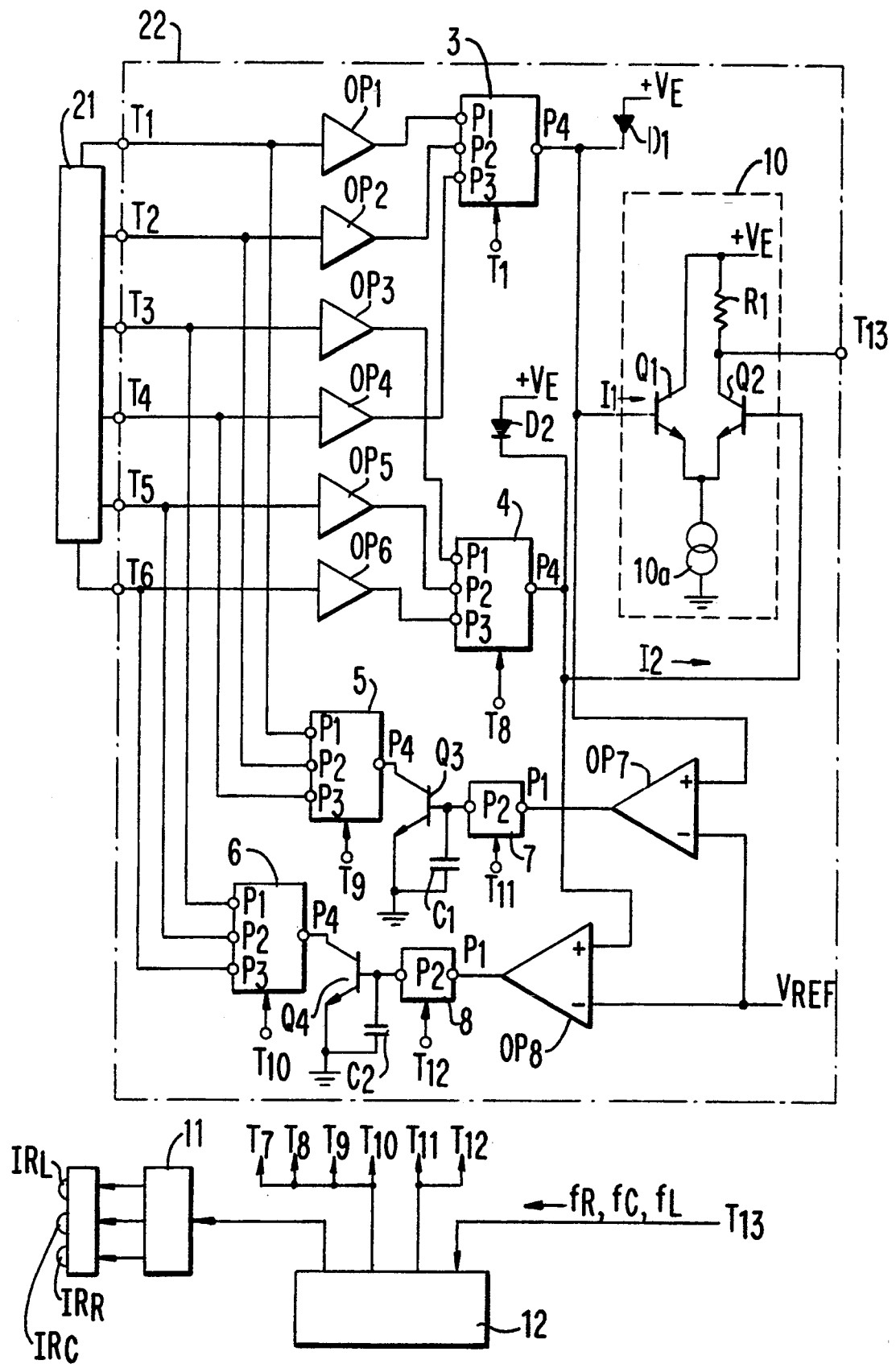
FIG. 3 is a block diagram of a conventional camera distance measuring device for a camera.

One embodiment of the camera distance measuring device according to the present invention will be described below with reference to FIGS. 1 and 2. Elements or portions which are common to FIGS. 1 and 3 are denoted by the same reference numerals, and description thereof is omitted.

Figure 1:
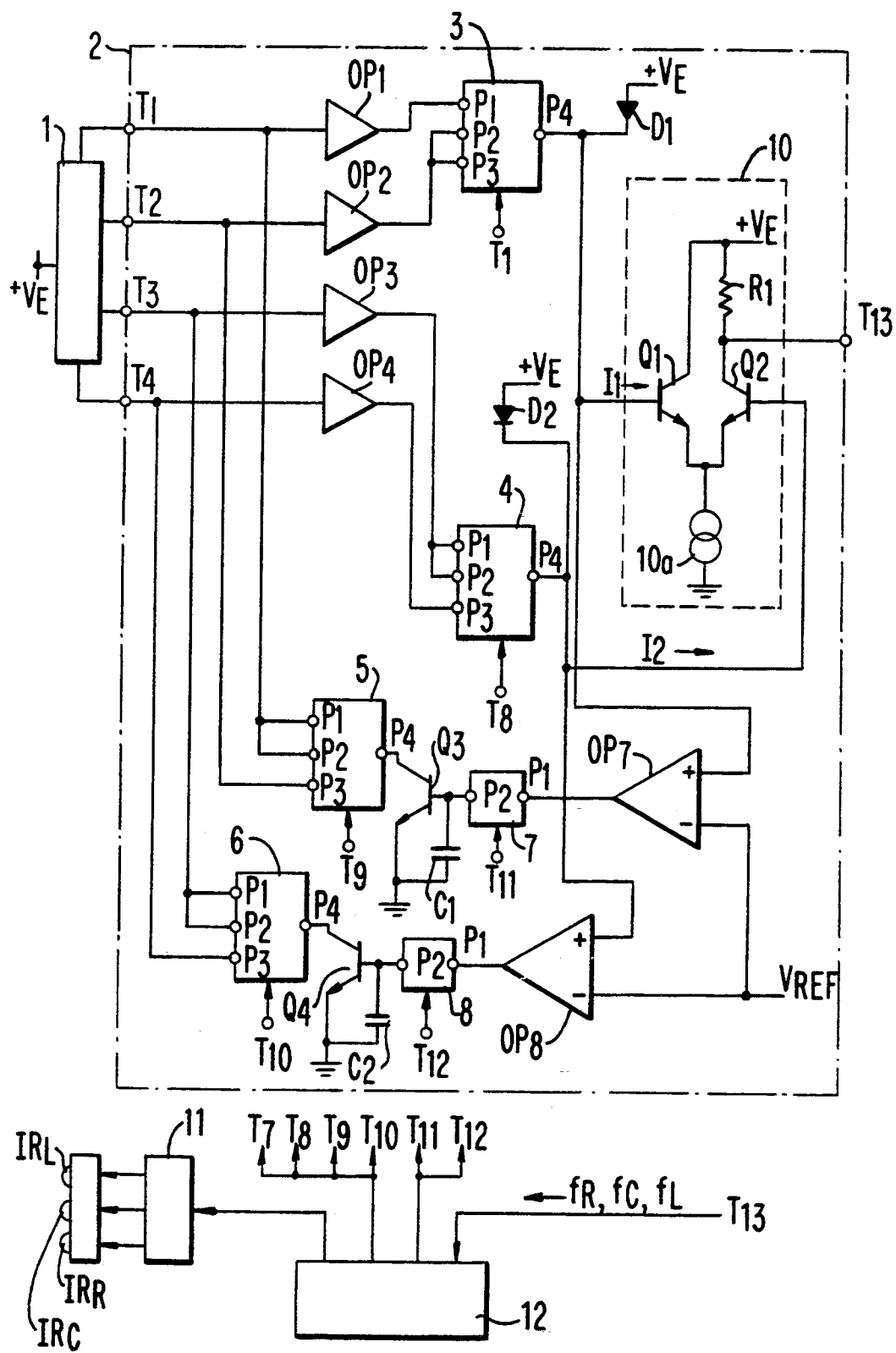
FIG. 1 is a block diagram showing one embodiment of the camera distance measuring device according to the present invention.

As shown in FIG. 1, the camera distance measuring device according to the present invention comprises an AFIC 2, a PSD 1, a light-emitting diode driver circuit 11 for driving a right infrared-emitting diode $IR_R$, a center infrared-emitting diode $IR_C$ and a left infrared-emitting diode $IR_L$, and a CPU 12 for controlling the light-emitting diode driver circuit 11. When the reflected light is incident on the PSD 1, a right distance signal $f_R$, a center distance signal $f_C$ and a left distance signal $f_L$ are delivered from a distance signal output terminal $T_{13}$ of the AFIC 2 to the CPU 12.

The AFIC 2 comprises a right preamplifier $OP_1$, a center-right preamplifier $OP_2$, a center-left preamplifier $OP_3$ and a left preamplifier $OP_4$, which correspond respectively to a right PSD terminal $T_1$, a center-right PSD terminal $T_2$, a center-left PSD terminal $T_3$ and a left PSD terminal $T_4$, to which electrodes of the PSD 1 are connected. Synchronizing switches 3 and 4 are provided for differential current, synchronizing switches 5 and 6 are provided for holding background light, and switches 7 and 8 are provided for holding background light. These switches are solid-state devices. The AFIC 2 further comprises operational amplifiers $OP_7$ and $OP_8$ for eliminating non-signal light, transistors $Q_3$ and $Q_4$ for by-passing background light, and a differential amplifier 10 for distance signals. The output terminal of the right preamplifier $OP_1$ is connected to an input terminal $P_1$ of the differential current synchronizing switch 3, while the output terminal of the center-right preamplifier $OP_2$ is connected to input terminals $P_2$ and $P_3$ of the synchronizing switch 3 which are connected together. An output terminal $P_4$ of the synchronizing switch 3 is connected to the base of a transistor $Q_1$ in the distance signal differential amplifier 10, and also to the cathode of a logarithmic compression diode $D_1$ whose anode is connected to a power supply $+V_E$. The output terminal of the left preamplifier $OP_4$ is connected to an input terminal $P_3$ of the differential current synchronizing switch 4, while the output terminal of the center-left preamplifier $OP_3$ is connected to input terminals $P_2$ and $P_1$ of the synchronizing switch 4 which are connected together. An output terminal $P_4$ of the synchronizing switch 4 is connected to the base of a transistor $Q_2$ in the distance signal differential amplifier 10, and also to the cathode of a logarithmic compression diode $D_2$ whose anode is connected to the power supply $+V_E$.

The input terminal of the right preamplifier $OP_1$ is connected to an input terminal $P_1$ of the background light hold synchronizing switch 5, while the input terminal of the center-right preamplifier $OP_2$ is connected to input terminals $P_2$ and $P_3$ of the synchronizing switch 5 which are connected together. An output terminal $P_4$ of the synchronizing switch 5 is connected to the collector of the background light by-pass transistor $Q_3$. The emitter of the transistor $Q_3$ is connected to a reference potential node, while the base thereof is connected to one end of a background light holding capacitor $C_1$, the other end of which is connected to the reference potential node. The input terminal of the left preamplifier OP$_4$ is connected to input terminal P$_3$ of the background light hold synchronizing switch 6, while the input terminal of the center-left preamplifier OP$_3$ is connected to the input terminals P$_1$ and P$_2$ of the synchronizing switch 6 which are connected together. An output terminal P$_4$ of the synchronizing switch 6 is connected to the collector of the background light bypass transistor Q$_4$, while the base thereof is connected to one end of a steady light hold capacitor C2, whose other end is connected to the reference potential node. Further, the bases of the steady light cut-off transistors Q$_3$ and Q$_4$ are connected to respective output terminals P$_2$ of the background light hold switches 7 and 8. Input terminals P$_1$ of the switches 7 and 8 are connected to the respective output terminals of the non-signal light eliminating operational amplifiers OP$_7$ and OP$_8$. A reference voltage V$_{REF}$ is applied to the (−) terminals of the operational amplifiers OP$_7$ and OP$_8$. The (+) terminals of the operational amplifiers OP$_7$ and OP$_8$ are connected to the respective bases of the transistors Q$_1$ and Q$_2$ in the distance signal differential amplifier 10.

In the camera distance measuring device arranged as described above, when the right infrared-emitting diode IR$_R$, the center infrared-emitting diode IR$_C$ and the left infrared-emitting diode IR$_L$ are sequentially driven by the light-emitting diode driver circuit 11, the right preamplifier OP$_1$, the center-right preamplifier OP$_2$, the center-left preamplifier OP$_3$ and the left preamplifier OP$_4$, which correspond to the right PSD terminal T$_1$, the center-right PSD terminal T$_2$, the center-left PSD terminal T$_3$ and the left PSD terminal T$_4$, to which the electrodes of the PSD 1 are respectively connected, are activated synchronously with the drive of the light-emitting diode driver circuit 11. At the same time, the input and output terminals P$_1$ and P$_4$ of the differential current synchronizing switches 3 and 4 are interconnected in the first synchronous timing step. When the input and output terminals P$_1$ and P$_4$ are closed in the first synchronous timing step, a distance current I$_1$ flows through the base of the transistor Q$_1$ in the distance signal differential amplifier 10. In addition, a distance current I$_2$ flows through the base of the transistor Q$_2$. Therefore, a right distance signal f$_R$ is delivered from the distance signal output terminal T$_{13}$ of the AFIC 2 to the CPU 12. In the next, i.e. second, synchronous timing step, the input and output terminals P$_2$ and P$_4$ are interconnected, so that a center distance signal f$_C$ is delivered from the distance signal output terminal T$_{13}$ of the AFIC 2 to the CPU 12. Similarly, at the next, i.e. third, synchronous timing step, the input and output terminals P$_3$ and P$_4$ are interconnected, so that a left distance signal f$_L$ is output. The CPU 12 calculates the input right, center and left distance signals f$_R$, f$_C$ and f$_L$ in response to its input T$_{13}$. If the center distance signal f$_C$ represents a relatively long distance, for example, the CPU 12 executes various kinds of programmed calculation, such as calculation for preventing focusing error.

It should be noted that the background light hold synchronizing switches 5 and 6, the background light hold switches 7 and 8, the non-signal light eliminating operational amplifiers OP$_7$ and OP$_8$, and the background light by-pass transistors Q$_3$ and Q$_4$ constitute a noise preventing circuit, in which the background light hold synchronizing switches 5 and 6 each output only the infrared-emitting diode signal to the distance signal differential amplifier 10 during each of the first to third synchronous timings, thereby eliminating noise, e.g., background light, superposed on the distance currents I$_1$ and I$_2$.

Figure 4:
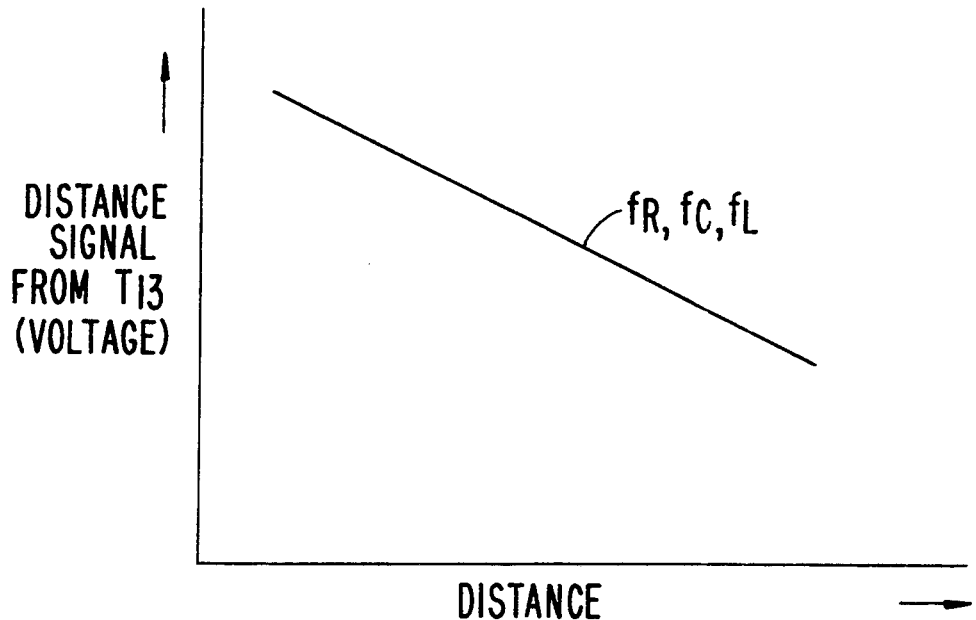
FIG. 4 is a graph showing the characteristics of the conventional camera distance measuring device.

In the camera distance measuring device connected as described above, if the spacing between the two end electrodes of the PSD 1 is 4 mm and the distances between the first and second intermediate electrodes on the one hand and the two end electrodes on the other are each 1 mm, then the distance between the first and second intermediate electrodes is 2 mm. FIG. 2 shows the characteristics of the right distance signal f$_R$, the center distance signal f$_C$ and the left distance signal f$_L$ output from the distance signal output terminal T$_{13}$ in the described arrangement. The characteristics of the distance signals in the prior art are shown in FIG. 4.

Although in the foregoing embodiment the present invention has been described with regard to the improvements in the position sensitive device and arithmetic circuit used in the arrangement where light is projected onto the subject from three infrared-emitting diodes, it should be noted that the present invention is not necessarily limited thereto. That is, even when light is projected onto the subject by using four or more infrared-emitting diodes, effects which are equivalent to the above can be obtained by arranging the system such that, for the output of the position sensitive device corresponding to an end infrared-emitting diode, an end electrode corresponding to this infrared-emitting diode and an intermediate electrode located apart from the end electrode with at least one intermediate electrode disposed therebetween are used as output terminals, and for projection of light from an infrared-emitting diode other than those disposed at both ends, intermediate electrodes are properly selected as output terminals.

By providing first and second intermediate electrodes between a pair of electrodes of the position sensitive device, the chip size of the automatic focusing IC is minimized and the cost of the IC is lowered. By reducing the number of conductors needed for the output terminals of the position sensitive device, the influence of noise is minimized. In addition, the packaging space can be reduced and the S/N can be larger.

What I claim is:

1. A camera distance measuring device comprising:
   center, left and right infrared-emitting diode means for emitting a center beam for centrally illuminating a subject, and left and right peripheral beams for illuminating subjects in left and right peripheral regions, respectively;
   a position sensitive device having a plurality of electrodes consisting of a first outer electrode, a second outer electrode, and first and second intermediate electrodes between said first and second outer electrodes, said electrodes being positioned to produce outputs in response to light from said diode means that is reflected from a subject;
   a plurality of amplifiers having inputs separately connected to said first electrode, said second electrode, said first intermediate electrode, and said second intermediate electrode; and
   arithmetic circuit means, electrically connected with said amplifiers, for calculating center, left and right distance data from a composite output delivered synchronously from the amplifiers of said plurality of amplifiers and responsive to each of said center, left and right peripheral beams reflected from the subject onto said position sensitive device.

2. The camera distance measuring device of claim 1, further comprising differential amplifier means for producing an output in response to outputs from different pairs of said electrodes supplied thereto, and switch means for supplying said outputs from said electrodes to said differential amplifier means.

3. The camera distance measuring device of claim 2, wherein said switch means includes first selecting switch means for supplying one output from an electrode to one input of said differential amplifier means and second selecting switch means for supplying another output of another electrode to another input of said differential amplifier means.

4. The camera distance measuring device of claim 3, wherein each said selecting means includes three inputs, with one input supplied with an output from a respective outer electrode and the other two inputs supplied with a common output from a respective intermediate electrode.

5. A camera distance measuring device comprising:
   center, left and right infrared-emitting diode means for emitting beams to illuminate subjects in a central region and left and right peripheral regions, respectively;
   a position sensitive device having at least four electrodes including first and second outer electrodes and first and second intermediate electrodes positioned intermediate said first and second outer electrodes, said electrodes being positioned to produce outputs in response to light from said diode means that is reflected from a subject;
   means, connected with said diode means, for sequentially energizing said diode means;
   an arithmetic circuit; and
   means, connected to said position sensitive device and said arithmetic circuit, for supplying composite outputs of separate groups of said electrodes to said arithmetic circuit synchronously with energization of separate ones of said diode means, at least two of said groups of electrodes including electrodes common to another of said groups of electrodes; and
   said arithmetic circuit comprising means responsive to said composite outputs for determining distances to the subject irradiated by said beams.

6. The camera distance measuring device of claim 5, wherein said means for supplying composite outputs comprises:
   a differential amplifier circuit having first and second inputs and producing an output,
   selecting switch means, connected with said differential amplifier circuit, for supplying outputs of said electrodes to said differential amplifier circuit,
   means, connected between said electrodes and said selecting switch means, for connecting outputs of said electrodes to said selecting switch means, and
   means, connected between said differential amplifier circuit and said arithmetic circuit, for connecting the output of said differential amplifier circuit to said arithmetic circuit.

7. The camera distance measuring device of claim 6, wherein said means for connecting outputs of said electrodes to said selecting switch means comprises separate amplifier means for connecting each electrode to said selecting switch means.

8. The camera distance measuring device of claim 6, wherein said selecting switch means includes first selecting switch means for supplying one output from one electrode to one input of said differential amplifier circuit and second selecting switch means for supplying another output from another electrode to another input of said differential amplifier circuit.

9. The camera distance measuring device of claim 8, wherein each said first selecting switch means and second selecting switch means includes three inputs, with one input supplied with an output from a respective outer electrode and the other two inputs supplied with a common output from a respective intermediate electrode.

10. A camera distance measuring device comprising:
    center, left and right infrared-emitting diode means for emitting beams to illuminate subjects in a central region and left and right peripheral regions, respectively;
    a position sensitive device having at least four electrodes including first and second outer electrodes and first and second intermediate electrodes positioned between said first and second outer electrodes, said electrodes being positioned to produce outputs in response to light from said diode means that is reflected from a subject;
    means, connected to said diode means, for sequentially energizing said diode means;
    an arithmetic circuit; and
    means, connected to said position sensitive device and said arithmetic circuit, for supplying composite outputs of separate groups of said electrodes to said arithmetic circuit synchronously with energization of separate ones of said diode means, said means for supplying comprising:
    differential amplifier means having first and second inputs and producing an output,
    means, connected between said differential amplifier means and said arithmetic circuit, for connecting the output of said differential amplifier means to said arithmetic circuit, and
    selecting switch means, connected to said electrodes and said differential amplifier means, for sequentially connecting separate pairs of outputs of said electrodes to said first and second inputs of said differential amplifier means in synchronism with energization of said diode means, said pairs of outputs comprising outputs of said first outer electrode and second intermediate electrode, said first and second intermediate electrodes, and said first intermediate electrode and second outer electrode, respectively.

11. The camera distance measuring device of claim 10, wherein said selecting switch means includes first selecting switch means for supplying one output from one electrode to one input of said differential amplifier means and second selecting switch means for supplying another output from another electrode to another input of said differential amplifier means.

12. The camera distance measuring device of claim 11, wherein each said first selecting switch means and second selecting switch means includes three inputs, with one input supplied with an output from a respective outer electrode and the other two inputs supplied with a common output from a respective intermediate electrode.

* * * * *